United States Patent [19]

Schoenherr et al.

[11] 4,188,822
[45] Feb. 19, 1980

[54] METHOD AND APPARATUS OF TESTING A MODEL

[75] Inventors: Karl L. Schoenherr, Washington, D.C.; Strasberg, Murray; Charles Devin, both of Montgomery County, Md.

[73] Assignee: The United States of America as represented by the Secretary of the Navy, Washington, D.C.

[21] Appl. No.: 394,387

[22] Filed: Aug. 31, 1964

[51] Int. Cl.² ............................................. G01M 9/00
[52] U.S. Cl. ...................................................... 73/147
[58] Field of Search .................. 73/69, 147; 181/0.5 B

[56] References Cited

U.S. PATENT DOCUMENTS

| 2,448,966 | 9/1948 | Fales | 73/147 |
| 2,968,944 | 1/1962 | Manoni | 73/147 |
| 3,027,760 | 4/1962 | Holderer | 73/147 |

*Primary Examiner*—Verlin R. Pendegrass
*Attorney, Agent, or Firm*—R. S. Sciascia; Q. E. Hodges

EXEMPLARY CLAIM

1. A method for determining the sound generated by a submarine propeller by testing a model submarine in a wind tunnel comprising the steps of:
  placing said model submarine containing a propeller in an air stream;
  rotating the propeller of said submarine model,
  measuring the sound generated by the model submarine.

6 Claims, 4 Drawing Figures

METHOD AND APPARATUS OF TESTING A MODEL

The invention described herein may be manufactured and used by or for the Government of the United States of America for governmental purposes without the payment of any royalties thereon or therefor.

The present invention relates to the testing of ship models and more particularly to the testing of ship models in an anechoic wind tunnel.

Heretofore, it was generally felt that testing of models of submarines were of little value in the investigation of vibration problems because strict similation of vibratory phenomena demanded models scaled not only with respect to hydrodynamic character but also with respect to elastic characteristics of the hull. The construction of such elastically scaled models, while feasible, has always proved costly and time consuming. Hence, it was believed, that experimentation on full-scale submarines was the only rational approach towards a solution of vibratory problems.

The present invention eliminates the requirement that the model submarine to be tested has to have a hull having scaled elastic characteristics. Very briefly, an operating model of a powered submarine is placed in an anechoic wind tunnel, and the sound generated by the model is detected by a microphone. The electrical output of the microphone corresponding to the sound generated by the model is amplified and the frequency spectrum of the amplified signal is obtained by a frequency wave analyzer. A level recorder is provided for recording the frequency spectrum of the analyzed signal.

An object of the invention is to provide an economic method for testing powered submarines for noise generation.

A further object of the invention is to provide a method for determining the optimun design characteristics of a ship's propeller.

Still another object of the invention is to provide a method for determining the factors governing the generation of vibration by ships moving through a body of water.

Yet another object of the invention is to provide a non-nonreverberant testing facility for testing models of ships.

Other objects and many of the attendant advantages of this invention will be readily appreciated as the same becomes better understood by reference to the following detailed description when considered in connection with the accompanying drawings wherein.

Figure 3:
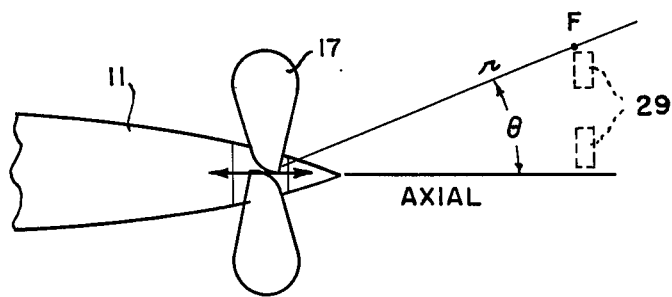
FIG. 3 is illustrative of the relationship of the various quantities utilized to calculate the fluctuating thrust of the rotating propeller.

In order to better understand the operation of the apparatus to be described, a brief discussion of the generation of vibratory forces by a propeller is first presented. The blade frequency fluctuation of the thrust developed by the propeller is a cause of the vibration of the submarine. These fluctuations occur because the propeller blades rotate through the nonuniform flow existing in the wake of a submarine hull. In the past, attempts to measure the alternating propeller thrust have been made with a thrust dynamometer installed on a model submarine operating in a towing basin. However, these dynamometers were not accurate for alternating forces and the test procedure was time consuming. The present invention overcomes these difficulties by utilizing a sound measurement in air to indicate the fluctuating thrust. The sound resulting from the fluctuating thrust can be obtained from the following relationship:

$$p = (fF/2\ rc) \cos \theta$$

where
p is the sound pressure;
r is the distance from source to point of measurement;
c is the speed of sound;
f is the sound frequency equal to the number of revolutions per unit time of the propeller shaft times the number of blades on the propeller times the harmonic number of interest;
F is the fluctuating thrust component at frequency f; and
$\theta$ is the angle between the propeller shaft axis and the radius vector to the measuring point at a distance v from the center of the propeller (as shown in FIG. 3).

Figure 1:
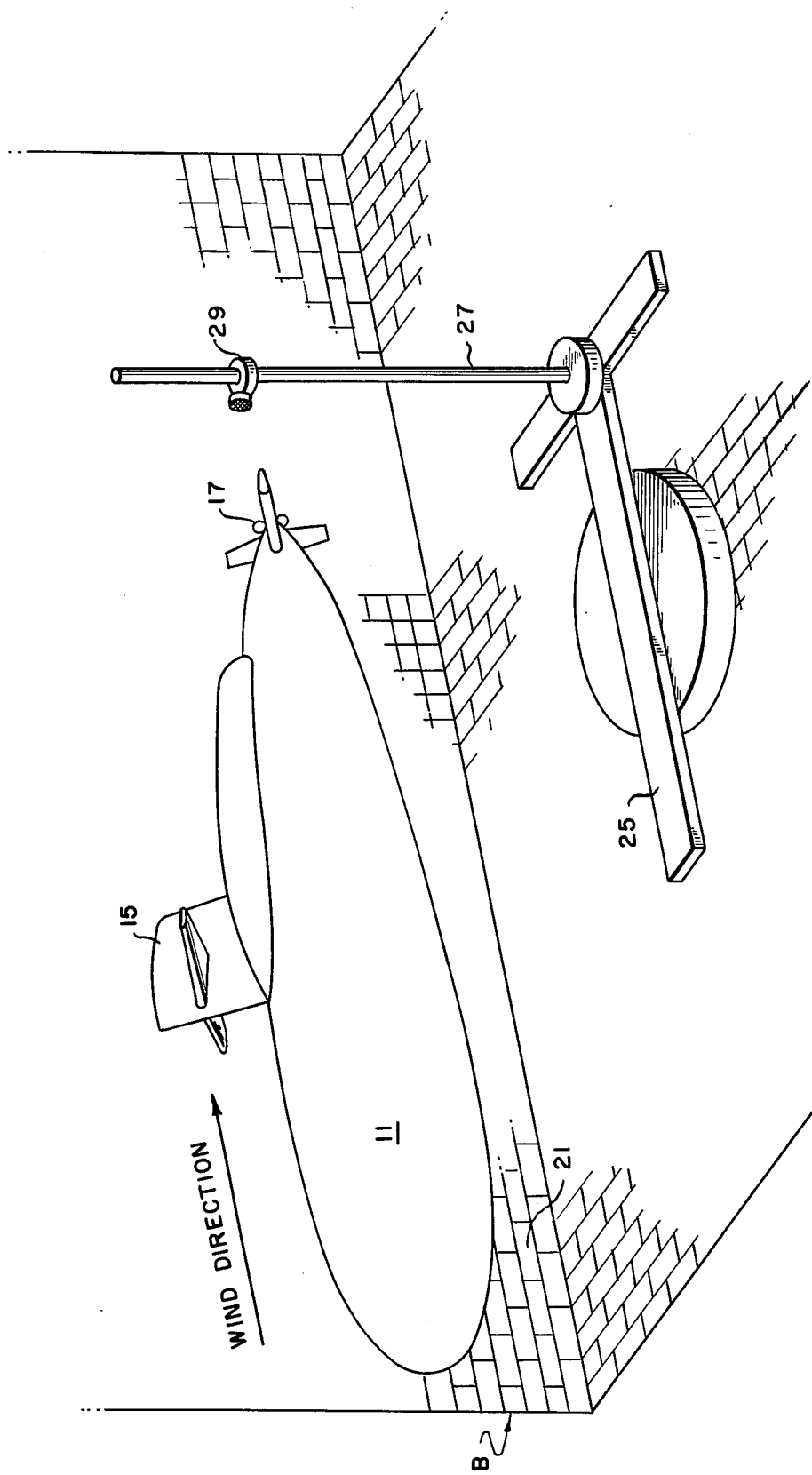
FIG. 1 is a plan view of a portion of an anechoic wind tunnel having features of this invention incorporated therewith.

Referring to FIG. 1, a powered submarine model 11 is mounted from the floor or ceiling of the anechoic wind tunnel 13 by way of a streamline mounting strut which is not illustrated. The advance ratio, V/nd, of the submarine model is equal to the advance ratio of the actual powered submarine, where V is the velocity of the ship, n is the rotating speed of propeller shaft and d is the diameter of the propeller.

The strut is attached to and has approximately the same shape as the model submarine bridge fairwater 15. A propeller 17 which is capable of being rotated is placed on the stern of the model submarine 11.

The wind tunnel 13 is lined with a suitable three-quarter inch thick acoustical tile 21 attached to the walls to prevent acoustical reverberations. However, any suitable acoustical absorbing means may be utilized to prevent acoustical reverberations. The acoustical tile can be mounted on a ½ inch wall board if a mounting surface is necessary. A turntable 25 containing a support rod 27 is provided for adjustable mounting a microphone 29 having a streamlined nose cone. Any suitable highly sensitive microphone may be used. A satisfactory microphone for use in the embodiment described is a Bruel and Kjaer (Type 4134) microphone which is fitted with a (UA0052) streamlined nose cone. The microphone and nose cone are described in "Instruction and Applications for Condenser Microphone" 4133/4134, published 1961 by Bruel and Kjaer, Nacrum Denmark.

Figure 2:
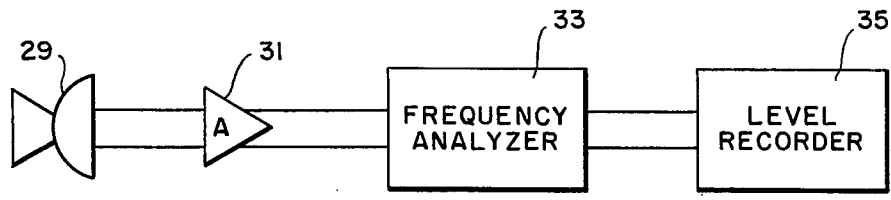
FIG. 2 is a block diagram of a frequency analyzer utilized in the invention.

In order to better understand the operation of the system described in FIG. 1 a description of FIG. 2 is first presented. Referring to FIG. 2a, microphone 29 has its output connected to the input of amplifier 31. The output of the amplifier 31 is connected to the input of a suitable constant narrow-band frequency analyzer 33. Any suitable frequency analyzer may be used. A satisfactory wave analyzer for use in the embodiment described in the "FRA2T Wave Analyzer" described in the "Instruction Manual" Type FRA2 and FRA2T Wave Analyzer, published 1959 by Radiometer-72

Emdrupsy-Copenhagen NV-Denmark. The output of the frequency analyzer 33 is connected to the input of a level recorder 35. Any suitable level recorder may be used. A satisfactory level recorder for use in the embodiment described is the Bruel and Kjaer level recorder type 2304 described in the "Instructions and Applications of the Level Recorder Type 2304" published in 1951 by Bruel and Kjaer, Naerum Denmark.

Figure 4:
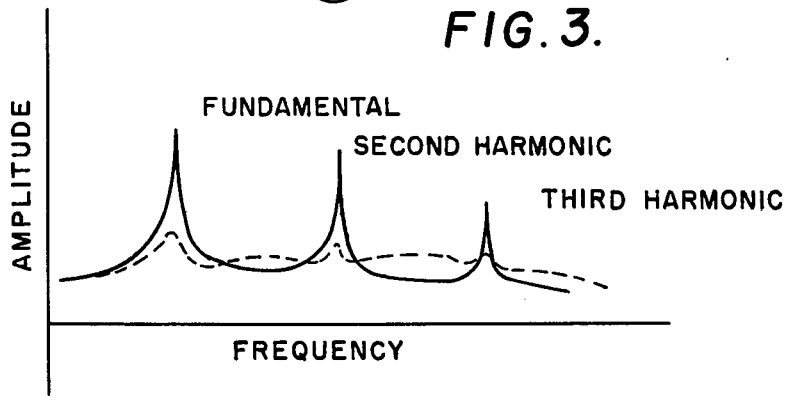
FIG. 4 is an illustrative graph of the sound pressure versus frequency of a model submarine under test.

In the operation of the wind tunnel 13 illustrated in FIG. 1, the air is caused to flow in the direction of the arrow. The propeller speeds and wind tunnel speeds are chosen to give the model the proper advance-ratio of the prototype at deep submergence. However, with the assumption that scale effects due to viscosity are absent, the actual speeds used are a matter of convenience only, provided that the proper advance ratio is maintained and the blade frequency and its harmonics do not coincide with mechanical resonances of the model. In one embodiment of the invention constructed in the laboratory the velocity of the wind is chosen to be 39 or 78 feet per second. The propeller is rotated 7780 rpm for the slower air flow and 15560 rpm for the faster air flow. Although the tests are performed in air, the wind speeds are slow enough to simulate the incompressible flow of water about the prototype. The sound generated by the propeller 17 of the submarine is detected by the microphone 29. The detected sound is converted into an electronic signal by the microphone 29. The output of the microphone is amplified in the amplifier 31. The amplifier signal is fed to the frequency analyzer which analyzes the signal into its frequency components. The frequency components are plotted as a spectrum by the level recorder. The solid line in FIG. 4 is an example of a spectrum obtained from a model submarine under test. The dashed line in FIG. 4 is an example of a hypothetically desirable spectrum for a submarine.

If necessary, the background noise in an anechoic wind tunnel caused by the moving air can be measured by removing the propeller from the model and measuring the detected noise.

Obviously many modifications and variations of the present invention are possible in the light of the above teachings. It is therefore to be understood that within the scope of the appended claims the invention may be practiced otherwise than as specifically described.

What is claimed is:

1. A method for determining the sound generated by a submarine propeller by testing a model submarine in a wind tunnel comprising the steps of:
    placing said model submarine containing a propeller in an air stream;
    rotating the propeller of said submarine model,
    measuring the sound generated by the model submarine.

2. A method for determining the sound generated by a submarine propeller by testing a model submarine in a wind tunnel comprising the steps of:
    placing said model submarine in an anechoic wind tunnel containing an air stream;
    rotating the model submarine propeller;
    measuring the sound generated by said propeller rotating in said air stream; and
    recording the measured sound.

3. A method for determining the sound spectrum generated by a submarine propeller by testing a model submarine in a wind tunnel comprising the steps of:
    placing said model submarine in an anechoic wind tunnel containing an air stream;
    rotating the model submarine propeller;
    detecting the sound generated by said propeller rotating in said air stream;
    analyzing the detected sound to determine the frequency components of the sound; and
    recording the frequency components of the sound.

4. A method for determining the sound spectrum generated by a submarine propeller by testing a model submarine in an air stream comprising the steps of:
    placing said model submarine in an anechoic wind tunnel having a substantially noncompressible air stream;
    rotating the model submarine propeller;
    detecting the sound generated by said propeller rotating in said substantially noncompressible air stream;
    analyzing the detected noise to determine the frequency components of the sound; and
    recording the frequency components of the sound.

5. A method for determining the fluctuating thrust of a submarine propeller by testing a model submarine in an air stream comprising the steps of:
    placing said model submarine in an anechoic wind tunnel containing an air stream;
    rotating the model submarine propeller;
    measuring the amount of sound generated by said propeller rotating through said air stream; and
    solving the following relationship $F = 2\ rcp/f \cos \theta$ for the fluctuating force (F);
    where P is the measured sound pressure;
    r is the distance to the point of measurement to the center of the propeller;
    c is the speed of sound;
    f is the sound frequency equal to the number of revolutions per unit time of the propeller shaft multiplied by the number of blades on the propeller multiplied by the harmonic number of interest; and
    $\theta$ is the angle between the propeller shaft axis and the radius vector to the measuring point at a distance r from the center of the propeller.

6. A method of determining the fluctuating thrust of a submarine propeller by testing a model submarine in a substantially noncompressible air stream comprising the steps of:
    placing said model submarine in an anechoic wind tunnel containing a substantially noncompressible air stream;
    rotating the model submarine propeller;
    measuring the amount of sound generated by said propeller rotating through said substantially noncompressible air stream; and
    solving the following relationship $F = 2\ rcP/f \cos \theta$ for the fluctuating force (F);
    where P is the measured sound pressure;
    r is the distance to the point of measurement to the center of the propeller;
    c is the speed of sound;
    f is the sound frequency equal to the number of revolutions per unit time of the propeller shaft multiplied by the number of blades on the propeller multiplied by the harmonic number of interest; and
    $\theta$ is the angle between the propeller shaft axis and the radius vector to the measuring point at a distance r from the center of the propeller.

* * * * *